United States Patent [19]
Gabelli et al.

[11] Patent Number: 5,492,416
[45] Date of Patent: Feb. 20, 1996

[54] ROLLING ELEMENT BEARING SYSTEM WITH A FILTERING SEAL

[75] Inventors: Antonio Gabelli, Ijsselstein; Gerardus De Vries, Nieuwegein, both of Netherlands; Gerhard Poll, Elgin, Ill.

[73] Assignee: SKF Industrial Trading & Development Co. B.V., Nieuwegein, Netherlands

[21] Appl. No.: 159,686

[22] Filed: Nov. 30, 1993

[30] Foreign Application Priority Data

Dec. 1, 1992 [NL] Netherlands ............................ 9202086

[51] Int. Cl.⁶ ............................ F16C 33/66; F16C 33/72
[52] U.S. Cl. ........................... 384/462; 384/473; 277/134
[58] Field of Search ................... 384/462, 469, 384/471, 473–475, 477, 484; 277/134, 152, 29, 23

[56] References Cited

U.S. PATENT DOCUMENTS

| | | | |
|---|---|---|---|
| 4,174,845 | 11/1979 | Hadaway | 277/134 |
| 4,575,265 | 3/1986 | Tooley | 384/484 |
| 4,772,138 | 9/1988 | Dreschmann et al. | 384/484 X |
| 4,793,424 | 12/1988 | Lim, Jr. | 277/23 X |
| 4,846,592 | 7/1989 | Tsumori et al. | 384/473 |
| 4,948,271 | 8/1990 | Nunotani et al. | 384/473 |
| 5,022,659 | 6/1991 | Otto | 277/134 X |
| 5,116,145 | 5/1992 | Jan de Vries | 384/471 X |
| 5,150,975 | 9/1992 | Major et al. | 384/465 |
| 5,154,517 | 10/1992 | Hodge | 384/470 |

FOREIGN PATENT DOCUMENTS

| | | |
|---|---|---|
| 9002218 U | 1/1971 | Germany . |
| 2029429 | 6/1990 | Germany . |
| 60-245948 | 5/1987 | Japan . |
| 61-48234 | 9/1987 | Japan . |
| 1319953 | 6/1973 | United Kingdom . |

*Primary Examiner*—Thomas R. Hannon
*Attorney, Agent, or Firm*—Rosen, Dainow & Jacobs

[57] ABSTRACT

A rolling element bearing system comprises at least one rolling element bearing with an outer race and an inner race which enclose a space containing rolling elements, which space is confined to the outside by sealing rings. At least one of the sealing rings and/or one of the races is provided with flow generating structure for feeding a lubricant into the space, as well as a filter for preventing the ingress of contaminations into the space with the lubricant. Preferably at least one of the sealing rings at its edge which slidably contacts one of the races has a shape which promotes the outflow out of the space towards the outside of the sealing ring during relative movement of the sealing ring and race.

18 Claims, 3 Drawing Sheets

ROLLING ELEMENT BEARING SYSTEM WITH A FILTERING SEAL

BACKGROUND OF THE INVENTION

The invention relates to a rolling element bearing system comprising at least one rolling element bearing with an outer race and an inner race which enclose a space containing rolling elements, which space is confined to the outside by means of sealing rings. Such rolling bearings are generally known. The rolling elements as well as the raceways of the races are protected against contaminations by the sealing rings so as to provide an acceptable service life.

In specific applications it is sufficient to introduce an amount of grease into said space, which stays there during the entire life of the bearing. In other applications however, such kind of lubrication is not sufficient, in particular for bearings applied in gear boxes or more in general in power transmissions. Such transmissions are oil bath lubricated; the sealing rings however prevent the inflow of splash lubricant into the bearing. This leads in some cases to a fast aging of the lubricant inside the bearing space.

If however in such cases a less tight sealing would be applied, or the sealing rings would be omitted altogether, any contaminations which accumulate in the oil due to wear of the transmission components such as tooth gears, would enter the bearing space and seriously deteriorate the capacities of the bearing.

Furthermore, in many cases it is necessary to control the amount of lubricant which is present in the bearing space in order to minimize friction losses.

SUMMARY OF THE INVENTION

The object of the invention is therefore to provide a bearing system which on the one hand is protected well against contaminations as present in oil bath lubricated systems, and which on the other hand is properly lubricated in a controlled manner. This object is achieved in that at least one of the sealing rings and/or one of the races is provided with flow generating means for feeding a lubricant into said space, as well as filtering means for preventing the ingress of contaminations into said space with the lubricant.

The porosity of the filtering means can be selected according to the nature of the contaminations to which the bearing will be exposed in service, as well as on the basis of the optimum life and lubrication performance of the bearing.

The flow generating means together with the filtering means may be provided in any suitable place. For instance, the flow generating means themselves may be situated in a location remote from the bearing system, and be connected thereto via a flowline. Preferably, however, integrated pumping means are provided for generating an underpressure in the enclosed bearing space. Such an underpressure will promote the inflow of lubricant into the bearing space, through the filtering membrane. Thereby, a constant replenishment of the lubricant is guaranteed. Also, any contaminations produced inside the bearing will be discharged from the bearing space together with the flow of lubricant thus generated.

According to a preferred embodiment at least one of the sealing rings is provided with an opening covered by a filtering membrane. Such sealing rings can be installed relatively easily on any kind of bearing.

In order to achieve the desired lubricant supply, at least one of the sealing rings at its edge which slidably contacts one of the races has a shape which promotes the outflow from the said space towards the outside of said sealing ring during relative movement of said sealing ring and race. Such shape may for instance be provided by said edge having a lip the inside surface of which encloses a relatively small angle with the race surface lying inwards with respect to the sealing ring, and the outside surface of which enclosing a relatively large angle with respect to the race surface lying outwards with respect to the sealing ring.

The specific shape of the lip generates an outward flow when said lip and the opposite surface are moving relative to each other. Of course, further flow generating means may be provided on the lip, such as specific profiles in its surface.

In a first embodiment, at least one of the sealing rings is provided both with an opening covered by a filtering membrane as well as with a sliding edge promoting the outflow out of said space, which opening is situated at a distance from said sliding edge.

In a second embodiment one of the sealing rings is provided with an opening covered by a filtering membrane, and the other sealing ring is provided with a sliding edge promoting the outflow out of said space.

In a third embodiment both races at least at one of their sides are provided with rings which extend into the direction of the other race, both rings partly overlapping each other and delimiting a narrow radially oriented gap for generating a radially outward flow upon relative rotation of both races.

In a fourth embodiment the system comprises at least one rolling element bearing having two rows of rollers and an outer race with a common spherical raceway, whereby the raceway is provided with at least one opening situated between the two rows of rollers for discharging lubricant under the influence of centrifugal forces upon rotation of the outer race. The underpressure thus generated within the enclosed bearing space leads to an inflow of lubricant through the filtering means.

The rolling element bearing system may also comprise two axially aligned rolling element bearings, the outer races and/or the inner races of which are mutually connected by a ring of filtering material.

Preferably, the sealing rings consist of an elastometric material. Thereby, a proper elastic pressure between the ring and the corresponding surface of the opposite, relatively movable race is obtained which is favourable for the pumping action sought.

The invention will now be described further with reference to several embodiments as shown in the figures. figures.

DETAILED DESCRIPTION OF THE INVENTION

Figure 1:
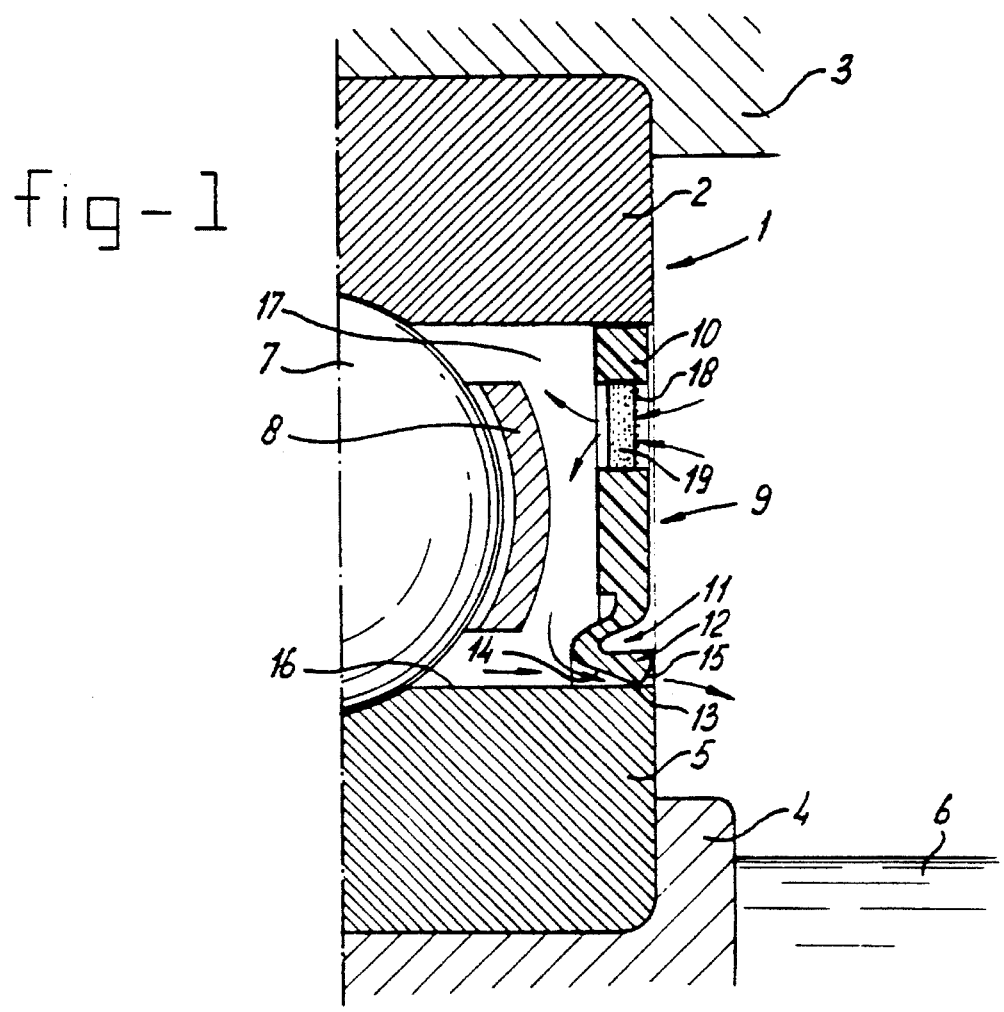
FIG. 1 shows a ball bearing with a sealing element according to the invention.

In FIG. 1 a ball bearing 1 is shown, the outer ring 2 of which is connected to a machine element 3 which is rotatable with respect to a housing 4, onto which the inner ring 5 of the bearing is connected. The housing 4 contains an oil bath 6, the oil of which, by the rotative movements of the machine elements is splashed onto the outside of the bearing. The bearing 1 furthermore contains balls 7 and a cage 8.

On the inner surface of race 2 a sealing element 9 according to the invention is clamped with its outer edge 10. The inner edge 11 of the sealing ring has a U-shaped cross section containing a sealing lip 12. The top 13 of this lip 12 contacts the outer surface of the race 5.

Moreover, the inner wall 14 of lip 12 makes a relatively small angle with respect to the outer surface of race 5, whereas the outer wall 15 of the lip 12 makes a relatively large angle with that surface. As a consequence of this form of lip 12, an outward flow, as indicated by the arrows A, is generated in the fluid next to said lip, when race 5, and thereby surface 16, is rotated with respect to lip 12. Thereby an underpressure is created in the internal bearing space 17, delimited by the races 2 and 5, and the sealing lips 12 on both sides.

The sealing element 9 is furthermore provided with a hole 18 covered with a filtering membrane 19. Thereby the oil which splashes onto the membrane, can enter the space 17 (see arrows B) via said membrane 19. The inflow of the oil is furthermore promoted by the underpressure generated by a relative movement of lip 12 and race 5. Any contaminations present in the splash oil are collected on the outside of the membrane 19, which means that only clean oil is entering the internal space 17. Once the oil has entered said space 17, it spreads over the balls 7 and the cage 8, as well as the raceways of the races 2 and 5.

Figure 2:
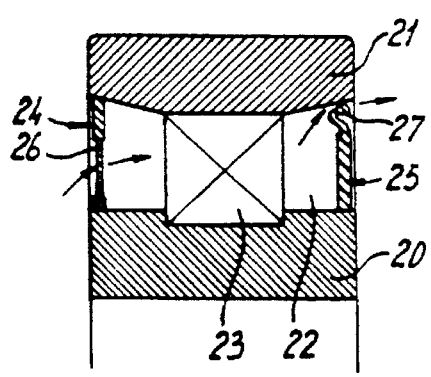
FIG. 2 shows a bearing with another set of sealing rings according to the invention.

FIG. 2 shows a second embodiment of the invention, in which different sealing rings are applied. Between the inner race 20 and the outer race 21 there is an internal space 22 which contains rolling elements 23. Said space is furthermore confined by sealing ring 24 and sealing ring 25. Sealing ring 24 contains an opening provided with a filtering membrane 26. It may be connected to either one of the races 20 or 21 and be slidable with the respect to the other race.

Sealing ring 25 however is clamped onto the race 20, and has an outer edge containing a lip 27 which has the same shape as the one discussed with reference to FIG. 1. Thereby, the lip 27 generates an underpressure in the internal space 22, upon rotation of race 21 with respect to race 20. Also, oil is sucked into the space 22 via filtering membrane 26.

Figure 3:
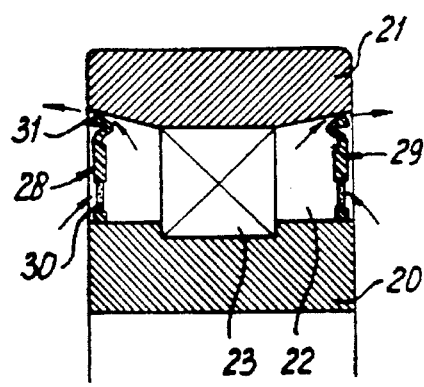
FIG. 3 shows a third embodiment.

FIG. 3 shows a third embodiment containing sealing rings 28 and 29. Both the sealing ring 28 and sealing ring 29 contain a filtering membrane 30, as well as a lip 31 which offers a pumping action. Thereby, oil is fed into the internal space 21 and pumped therefrom at both sides of the bearing.

Figure 4:
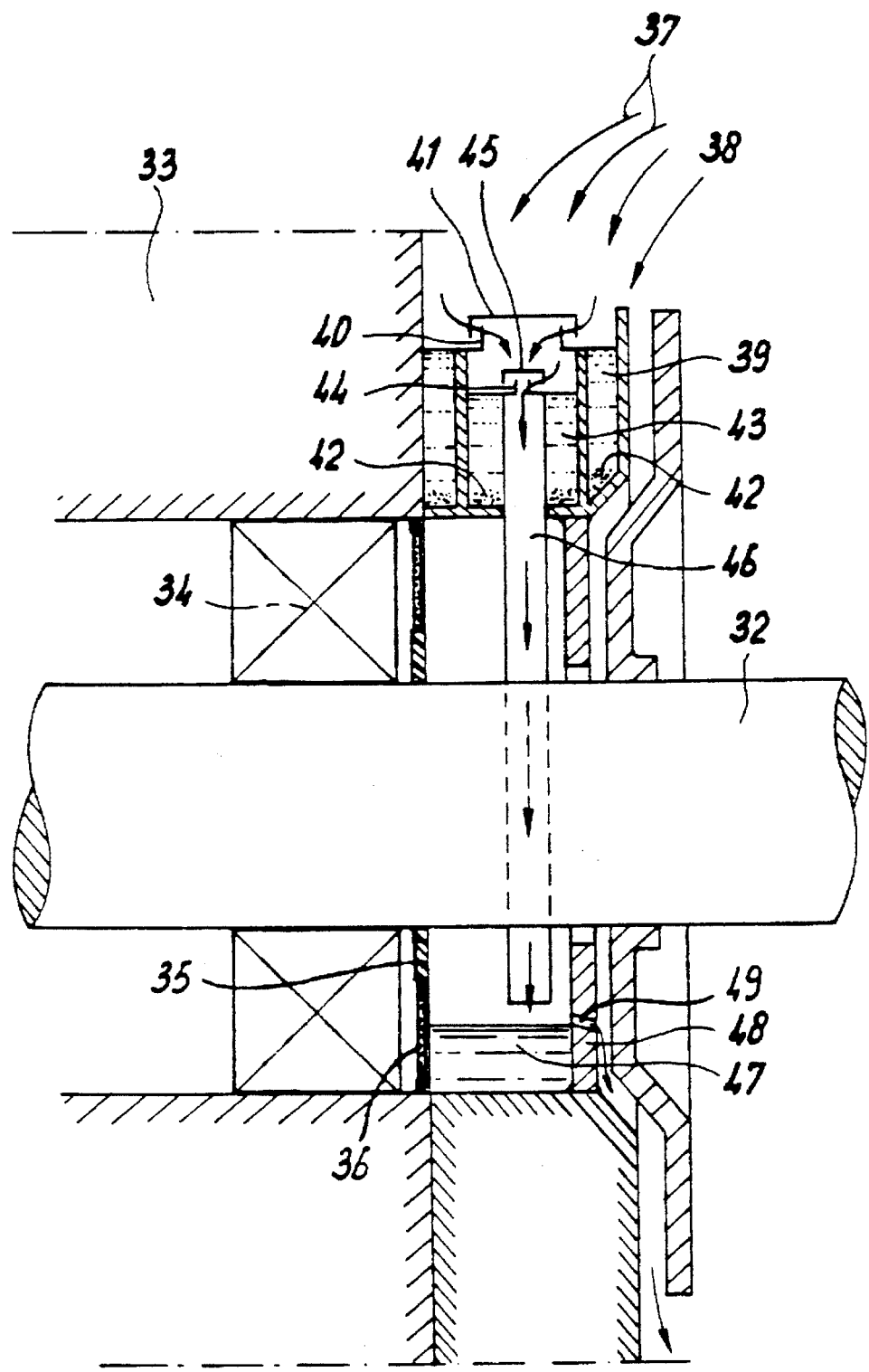
FIG. 4 shows a fourth embodiment.

In the embodiment of FIG. 4 the shaft 32 is supported rotatably with respect to the housing 33 by means of bearing 34. Next to said bearing 34 there is a sealing ring 35 which may be either clamped onto the shaft 32 or onto the housing 33. Said sealing ring contains a filtering membrane 36.

The splash oil 37 is collected in a cleaning device 38 which comprises a first chamber 39. Said chamber has an upper wall 40 which is covered by cap 41. The oil is shielded from the splashing action in such a way that the contaminations 42 may collect on the bottom of chamber 39. Subsequently the oil may flow over the upper edge of wall portion 40.

Thereafter, the oil is collected in chamber 43, where again contaminations 42 may be collected. Said chamber 43 has an upper wall 44 covered by cap 45.

The oil may now flow over the upstanding wall part 44 and flow through the tube 46 towards chamber 47. Also in this chamber contaminations may be collected. Finally the oil flows through opening 49 in wall part 48 of chamber 47 back into the oil bath. A part of the oil however will enter the space of the housing 33 where the bearing 34 is present via filter membrane 36. Thus, the oil entering the bearing 34 is very clean, having regard to the several cleaning steps which the oil has been exposed to.

Figure 5:
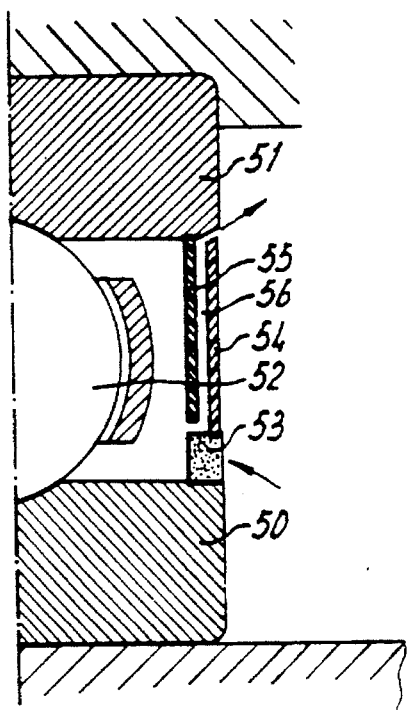
FIG. 5 shows a fifth embodiment.

The rolling element bearing shown in FIG. 5 comprises an inner race 50 and an outer race 51, supported by means of balls 52. Onto the inner race a ring of filtering material 53 has been connected. This ring 53 carries a ring 54 which is oriented radially outwardly, into the direction of the outer race 51, and delimits a narrow gap with respect to said outer race 51.

Onto the outer race 51 a further ring 55 is connected, which is oriented radially inwardly, and which delimits a narrow gap with respect to the filter ring 53 of sealing material. Also, rings 54 and 55 delimit a narrow, radially oriented gap 56. Upon rotation of ring 55 with respect to ring 54, a radially outwardly oriented flow from the bearing space delimited by the races 50, 51 and rings 54, 55 on either side of the bearing is generated. Thereby, an underpressure is created in said bearing space. Any splash oil which hits the ring of filtering material 53 is thereby sucked into the bearing space, where it is finally deposited on races 50, 51 and the balls 52.

Figure 6:
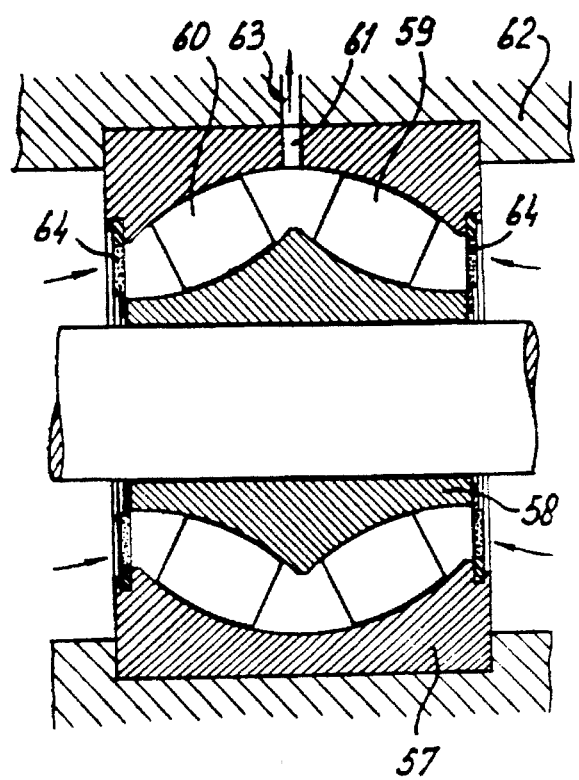
FIG. 6 shows a sixth embodiment.

The embodiment of FIG. 6 contains a spherical bearing with an outer race 57 and an inner race 58. Furthermore, there are two rows of rolling elements 59, 60. For the embodiment in which the outer race 57 is rotating, said race 57 is provided with at least one opening 61. Upon rotation of the outer race 57, centrifugal forces are generated which force an outflow through said opening 61. Of course, the element 62 which is connected to said outer race 57 should contain a bore 63, which is aligned with opening 61 in the outer race 57 and which allows the discharge from the bearing space.

In case the inner race is rotating, and the outer race is static, a hole may be provided in the lowest part of said outer race, so as to discharge the oil by gravity.

On both sides of the spherical bearing filtering rings 64 have been provided which allow the inflow of splash oil particles into the bearing space.

Figure 7:
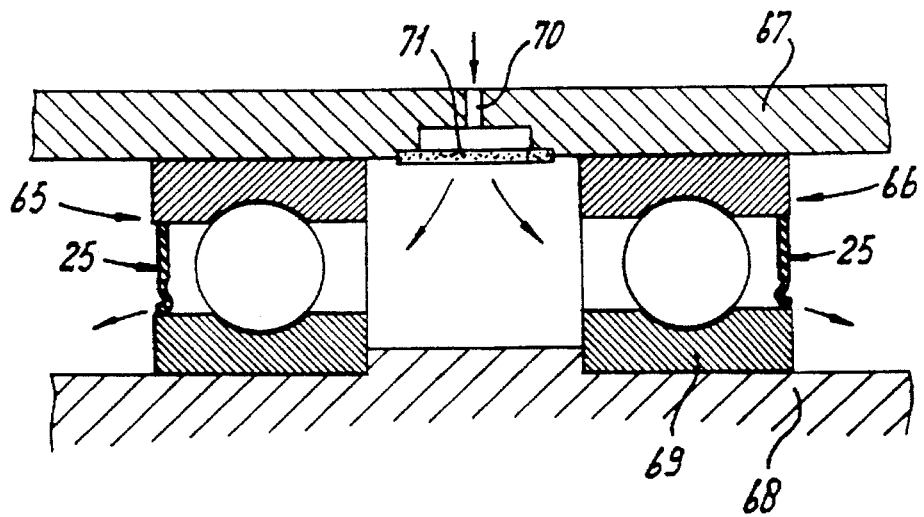
FIG. 7 shows a seventh embodiment.

The embodiment of FIG. 7 shows a set of two ball bearings 65, 66, which are connected to a housing 67 and a rotatable shaft 68. Both bearings 65, 66 are provided with sealing rings 25, as described in relation to FIG. 2. Upon rotation of the inner race 69 an outwardly oriented flow is generated. Thereby an underpressure is generated in the space delimited by housing 67, shaft 68 and rings 25. Through a bore 70 in the housing an inflow of oil particles may take place. Said bore is covered by a filtering membrane 71, in such a way that the ingress of contaminations is prevented.

We claim:

1. A rolling element bearing system including at least one rolling element bearing having outer and inner races which enclose an annular space having opposite ends, a plurality of rolling elements in said space and between said races, and a sealing ring closing each end of said space, characterized in that at least one of said sealing rings comprises flow generating means for feeding a lubricant into said space, and said system further comprises filtering means preventing the ingress of contamination into said space with said lubricant.

2. A system according to claim 1 further comprising integrated pumping means for generating an underpressure in said space.

3. A system according to claims 1 or 2 wherein at least one of said sealing rings includes an opening, said system further comprising a filtering membrane covering said opening.

4. A system according to claim 3 whereby said at least one sealing ring has outer and inner peripheral edges respectively corresponding to said outer and inner races, with one of said peripheral edges being a sliding edge slidably contacting its corresponding race and having a shape which promotes the outflow of lubricant out of said space during relative movement of said sealing ring and said race in slidable contact therewith.

5. A system according to claim 4 whereby said edge has a lip the inside surface of which encloses a relatively small angle with the race surface lying inwards with respect to the sealing ring, and the outside surface of which encloses a relatively large angle with respect to the race surface lying outwards with respect to the sealing ring.

6. A system according to claim 8 whereby said at least one sealing ring has outer and inner peripheral edges respectively corresponding to said outer and inner races, with one of said peripheral edges being a sliding edge slidably contacting the corresponding race and having a shape which promotes the outflow of lubricant out of said space during relative movement of said sealing ring and said race in slidable contact therewith, and wherein said flow generating means includes an opening in said sealing ring closer to the peripheral edge that is not said sliding edge.

7. A system according to claim 6 wherein said flow generating means includes: (a) an opening in said sealing ring which includes said integrated pumping means, and (b) a filtering membrane covering said opening.

8. A system according to claim 2 whereby said at least one sealing ring has outer and inner peripheral edges respectively corresponding to said outer and inner races, with one of said peripheral edges being a sliding edge slidably contacting the corresponding race and having a shape which promotes the outflow of lubricant out of said space during relative movement of said sealing ring and said race in slidable contact therewith, and wherein said flow generating means includes (a) an opening in the sealing ring which does not include said integrated pumping means, and (b) a filtering membrane covering said opening.

9. A system according to claims 1 or 2 whereby said flow generating means comprises a first and second rings, each having outer and inner peripheral edges corresponding to said outer and inner races respectively which races have respective bore surfaces, said first ring having its outer peripheral edge secured to said outer race at the bore surface thereof and its inner peripheral edge extending toward but not contacting the bore surface of said inner race, said second ring having its inner peripheral edge secured to said inner race at the bore surface thereof and its outer peripheral edge extending toward but not contacting the bore surface of the outer race, said first and second rings being axially spaced apart and overlapping delimiting a narrow radially oriented gap therebetween for generating a radially outward flow of lubricant from said space upon relative rotation of said races.

10. A system according to claim 9 wherein one of said rings further comprises a ring of filtering material forming its peripheral edge secured to one of said races, this filtering material comprising said filtering means.

11. A system according to claim 10 wherein said other of said rings has its peripheral edge which extends toward a bore surface being situated near but not touching said filtering material.

12. A system according to claim 1 whereby said at least one sealing ring has outer and inner peripheral edges respectively corresponding to said outer and inner races, with one of said peripheral edges being a sliding edge slidably contacting its corresponding race and having a shape which promotes the outflow of lubricant out of said space during relative movement of said sealing ring and said race in slidable contact therewith.

13. A rolling element bearing system including at least one rolling element bearing having outer and inner races which enclose an annular space having opposite ends, a plurality of rolling elements in said space and between said races, and a sealing ring closing each end of said space, characterized in that at least one of said races comprises flow generating means for feeding a lubricant into said space and filtering means for preventing the ingress of contamination into said space with said lubricant.

14. A system according to claim 13 wherein said rolling element bearing includes two rows of rollers in a common spherical raceway, and wherein said flow generating means includes an aperture extending outward through said outer race and communicating with said raceway between said two rows of rollers for discharging lubricant under the influence of centrifugal forces upon rotation of the outer race.

15. A system according to claim 14 wherein said filtering means comprises filtering material covering said aperture.

16. A system according to claim 13 wherein said rolling element bearing includes two rows of rollers generally axially aligned, and wherein said flow generating means includes an aperture extending outward through said outer race and communicating with said raceway between said two rows of rollers for discharging lubricant under the influence of centrifugal forces upon rotation of the outer race.

17. A system according to claim 13 wherein said filtering means is provided by at least one of said sealing rings comprising filtering material.

18. A system according to claim 17 wherein said filtering material comprises an elastomeric material.

\* \* \* \* \*